United States Patent Office 3,345,424
Patented Oct. 3, 1967

3,345,424
TELOMER COMPOSITIONS
Murray Hauptschein, Glenside, and Maurice Miville, Flourtown, Pa., assignors to Pennsalt Chemicals Corporation, Philadelphia, Pa., a corporation of Pennsylvania
No Drawing. Filed July 12, 1965, Ser. No. 471,406
6 Claims. (Cl. 260—653.1)

This invention relates to a novel telomer composition which is a mixture of certain polymeric fluorocarbons which are useful as water and oil repellants, mold release agents, and lubricants.

It is known in the art to prepare telomers from tetrafluoroethylene. As disclosed in U.S. 3,067,262 when tetrafluoroethylene is telomerized with trichlorotrifluoroethane, high molecular weight products are obtained which resemble polytetrafluoroethylene and such products are not in a form useful for coating onto surfaces. In order to obtain a wax-like product for coating utility, the disclosure of U.S. 3,067,262 teaches that a second active telogen must be included in the telomerization process and this results in wax-like products which melt above 260° C. Such active telogens are selected from the group of tertiary hydrocarbons, aliphatic alcohols, divalent sulfur compounds, aliphatic tertiary amines, aliphatic ethers, carbonyl compounds, and dialkyl phosphites. All of these active telogens contain hydrogen and consequently the telomer products contain significant amounts of hydrogen (e.g. from 0.05 to 2% by weight). While the products disclosed in U.S. 3,067,262 do find use as coatings for imparting oil and water repellency effects, mold release effects, lubricant effects and the like, they have certain deficiencies, at least some of which are probably due to the hydrogen contents of the products and/or the relatively high melting points. For example, the coatings from such telomers often change the visual appearance of the articles coated because they are chalky thereby making the coating visible. Another objection is their relatively poor oil and water repellent properties. Still another objection is that when used on fabrics or leather the hand of the treated material is changed. For these reasons it is desired to obtain improved materials which will not have these disadvantages. This is achieved by means of this invention which provides improved telomers having properties surprisingly superior to previously known telomer compositions.

The composition of this invention is a mixture consisting essentially of at least about 90% by weight of the mixture of polymers of the structure $$R—(CF_2CF_2)_nX$$

wherein R contains one to four carbon atoms and is selected from the group consisting of perfluoroalkyl and monochloroperfluoroalkyl, X is selected from the group consisting of chlorine and fluorine, n is an integer from 6 to 10, and wherein the balance of the polymer mixture consists of polymers of the above structure where n is 11 to 16. The compounds described above are useful as lubricants for mold release agents, also for imparting oil and water repellent properties to various surfaces, and for prevention of oil spreading.

The composition of this invention may be derived from the products obtained by telomerization of tetrafluoroethylene with certain haloalkanes. Thus, the composition of the invention may be made by the chlorination or fluorination of certain fractions of telomer iodide mixtures, such as those described in U.S. 3,156,732, issued on Nov. 10, 1964 in the name of Hauptschein and Braid.

The preferred compositions of the invention will be those where R is a group having the structure

where $R_1$ and $R_2$ are the same or different perfluoroalkyl and monochloroperfluoroalkyl radicals. These groups are obtained from the corresponding iodides used as telogens and will include, most preferably perfluoro groups. Useful groups will include

$(CF_3)_aCFI$ and also the telogen iodides having 1–4 carbon atoms set forth in column 3 lines 11 to 45 of U.S. 3,156,732. Also operable and useful as R in the above structural formula are such groups as $CF_3$—, $CLCF_2$—,

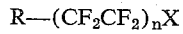

$C_2F_5$—, $CClF_2CF_2$—, $CClF_2CF_2CF_2$, n—$C_3F_7$—, n—$C_4F_9$—, $(CF_3)_2CF—CF_2$—, $(CF_3)_3C$—, and the like.

In telomerization processes such as described in U.S. 3,156,732, telomerization proceeds to yield a mixture of iodine containing products. The low molecular weight products where n is 2 to 5 are separated by distillation and are used as intermediates to a number of useful compositions such as surfactants and the like. The residue which remains where n has a value between 6 and 16 is the intermediate which by fluorination or chlorination yields the composition of this invention.

The general procedure by which the polymer mixtures of the invention are made will, in those instances where X is to be chlorine, involve the chlorination of the telomer iodide mixture whereby iodine is replaced by chlorine. The resulting molten product is simply filtered to remove any solid material and is cast into pans where it is allowed to harden by cooling and then ground into the desired size for further handling. In the case where X is to be fluorine, the product is made by conventional fluorination procedures using fluorine, cobalt trifluoride and the like.

As indicated by the above discussion, the solid polymer mixture of the invention will have a distribution of specific polymers so that it will consist of at least about 90% by weight of polymers where n is an integer from 6 to 10. The balance of the mixture will be those polymers where n is a value of 11 to 16. Preferred polymer mixtures will be further characterized by having a composition such that as the value of n increases the amount of specific polymer corresponding to that value will decrease. Such compositions of the invention are preferably obtained by the separation of a selected fraction obtained from the telomerization but it will be understood that mixtures made by combining the individual components are also included in the scope of the invention. As an example of how the polymer mixture may be composed, the following table is illustrative of a typical composition as determined by vapor phase chromatography, when R in the above formula is $(CF_3)_2—CF$—:

| Value of n: | Percent by weight of component corresponding to n value |
|---|---|
| 6 | 32.5 |
| 7 | 25.2 |
| 8 | 17.0 |
| 9 | 10.6 |
| 10 | 6.5 |
| 11 | 3.8 |
| 12 | 2.2 |
| 13 | 1.2 |
| 14 | 0.7 |
| 15 | 0.2 |
| 16 | 0.1 |

It will be understood that although careful distillation techniques will give products of the invention where no material is present where n is less than 6 or greater than 16, less rigorus distillation procedures or equipment may ermit very small amount of such components to be present without significantly detracting from the valuable roperties of the product of this invention. Likewise, the istribution of the components of the mixture will vary. A preferred composition, however, will have a distribution of components such that those components where is 6 to 7 exceeds the amount of those components where is 8 to 10.

The products of the invention have melting points from bout 100° C. to a temperature below about 200° C. They will have a number of average molecular weight elow about 1200 and this is consistent with the above defined distribution of components. Typical compositions lave number average molecular weights from about 880 o about 980.

In order to obtain the benefit of the excellent properties and ease of handling of the compositions, the distribution of components must be essentially in accord with the above-described distribution. If the mixture contains any significant amounts of higher molecular weight components, the composition is extremely hard, insoluble in solvents and difficult to handle and lacks desirable repellency and mold properties. On the other hand, lower molecular weight components, if they do not detract from other desirable properties are undesirable from the standpoint of high volatility.

A. PREPARATION OF TELOMER IODIDES

A 10 gallon Monel autoclave equipped with agitator is charged with 50.9 pounds of $CF_3CFICF_3$ and then agitated and heated. When a temperature of 170° C. is reached tetrafluoroethylene is added at 350 p.s.i.g. Although the reaction rate is slow at first it gradually increases so that the rate of tetrafluoroethylene addition reaches about 6 pounds per hour. The monomer feed is shut off when 55.4 pounds has been added over a 15 hour period. Stirring at 170° is continued for an additional 1 to 2 hours and the reaction vessel is then cooled and contents removed to recover the crude telomer iodide in an amount of 106 pounds. The crude telomer iodide has the following composition and boiling point range.

| Component | Composition, wt. percent | Boiling Point |
|---|---|---|
| $C_2F_4$+cyclic—$C_4F_8$ | 3.5 | |
| $CF_3CFICF_3$ | 12.5 | 40° C. at 760 millimeter. |
| $(CF_3)_2CF(CF_2CF_2)I$ | 7.1 | 95° C. at 760 millimeter. |
| $(CF_3)_2CF(CF_2CF_2)_2I$ | 15.8 | 63° C. at 48 millimeter. |
| $(CF_3)_2CF(CF_2CF_2)_3I$ | 17.3 | 83° C. at 23 millimeter. |
| $(CF_3)_2CF(CF_2CF_2)_4I$ | 15.0 | 111° C. at 23 millimeter. |
| $(CF_3)_2CF(CF_2CF_2)_5I$ | 11.0 | 137° C. at 18 millimeter. |
| $(CF_3)_2CF(CF_2CF_2)_{6-16}I$ | 17.8 | Above 137° C. at 18 millimeter. |

The crude telomer iodides are then distilled, first at atmospheric pressure to remove low boilers and perfluoroisopropyl iodide, and then under gradually increasing vacuum. Distillation is continued until a head temperature of 155° C. at 18 millimeters is reached at which point $(CF_3)_2CF(CF_2CF_2)_6I$ distills over and the distillation residue melts at about 120° C. This residue is of approximately the following composition—

| Component $(CF_3)_2$—$CF(CF_2CF_2)_nI$—$n=$: | Percent by weight |
|---|---|
| 6 | 35.2 |
| 7 | 29.1 |
| 8 | 17.3 |
| 9 | 9.5 |
| 10 | 4.9 |
| 11 | 2.3 |
| 12 | 1.0 |
| 13 | 0.5 |
| 14 to 16 | 0.2 |

The above mixture is used for conversion to the compositions of the present invention.

B. CHLORINATION PROCEDURE

The above distillation residue is charged to a reaction vessel equipped with a stirrer, a chlorine input tube, and an output tube leading to an aqueous solution of caustic and sodium bisulfite to trap excess chlorine and ICl by product. The reaction vessel is heated to 200° C. and when the temperature reaches 120° C. chlorine is introduced and as chlorination proceeds dark vapors of ICl are observed. The reaction is terminated when ICl is no longer in the outlet tube. The system is then swept free of chlorine with nitrogen. The melt is then filtered through cheesecloth to remove any insoluble material. The mass is poured into shallow pans and cooled. The polymer mixture is removed from the pans and broken into small lumps, or ground into a flour by adding solid pieces along with acetone to a Waring blender which reduces the pieces to fine particles. The acetone removes the last traces of any colored material which might be present. After filtering from the acetone, the material is washed with fresh acetone and air dried to give a pure white polymer product.

The composition made as above is a white solid that can be melted without decomposition to a colorless oil of low viscosity and is essentially all distillable. It is nonflammable and nontoxic. Some of the physical properties are as follows:

| | |
|---|---|
| Odor | none. |
| Melting point range | 105–150° C. |
| Boiling point range | More than 90% by weight boils over the range 450–630° F. (230–330° C.) at atmosphere pressure. |
| Density, g./cc. | 1.91. |
| Critical surface tension of wetting, dynes cm.$^{-1}$ | 20. |
| Vapor Pressure, mm. Hg | 0.3 at 77° F. (25° C.). |
| | 0.9 at 122° F. (50° C.). |
| | 3.4 at 176° F. (80° C.). |
| | 8.0 at 221° F. (105° C.). |
| | 25.0 at 266° F. (130° C.). |
| | 62.5 at 329° F. (165° C.). |
| | 112.5 at 365° F. (185° C.). |

The product has essentially a perfluorocarbon structure and contains no active functional groups or atoms and this accounts for its chemical inertness even in the presence of strong oxidizers, reducing agents, alkalis and acids. When a sample is sealed in a pyrex tube and heated at 750° F. for 16 hours no visible change is evident and only a negligible variation in viscosity appears.

The product is insoluble in water, but shows some solubility (on the order of 0.1 to 0.3%) in organic solvents such as ethylacetate, acetone, methanol, xylene, ether, carbon tetrachloride and the like. Higher solubility is obtained in solvents such as benzotrifluoride (1.5%), trichlorotrifluoroethane (3.7%), perfluorodimethylcyclobutane (6.6%) and other fluorinated solvents.

C. FLUORINATION OF TELOMER IODIDE

Three parts by weight of a mixture of polymer having the structure $(CF_3)_2$—$CF(CF_2CF_2)_nI$ where $n$ varied from 6 to 16 and with about 90% by weight of the mixture having a value of $n$ from 6 to 10, 6 parts of anhydrous sodium fluoride, 6 parts of anhydrous magnesium fluoride, and 750 parts of CCl₂F—CClF₂ were placed in a reaction vessel and a 3:1 by volume mixture of nitrogen and fluorine was bubbled through the slurry. After about 5 minutes the slurry turned to yellow and then changed to a rust color, constantly turning darker during the two hour treatment. After another two hours of fluorination, the color returned to a pale yellow. After flushing with nitrogen, the slurry was filtered and the solvent evaporated to give the product $(CF_3)_2$—$CF(CF_2CF_2)_nF$ which melted at 90–110° C. Tests for iodine were negative.

The products of the invention may be employed as an aqueous dispersion of the polymer mixture. Preparation of such dispersion requires the use as a surfactant of an amino acid (e.g. glycine, olanine, etc.) glycine derivative of perfluoroalkanoic acid (e.g. $C_{10}F_{21}CONHCH_2COOH$ and the like). Replacement of this type of surfactant with other various anionic and nonionic surfactants, both fluorinated and non-fluorine containing failed to yield a useful dispersion. The dispersion is preferably prepared in the following manner:

A 1-gallon stirred autoclave is charged with:

| | |
|---|---|
| H₂O _____g__ | 1640 |
| Polymer mixture corresponding to $(CF_3)_2CF(CF_2CF_2)_nCl$ (M.P. 105–45°) _____g__ | 700 |
| $C_{10}F_{21}CONHCH_2COOH$ _____g__ | 20 |
| $C_{10}F_{21}CONHCH_2CH_2OH$ _____g__ | 20 |
| NH₃ solution (to neutralize acid above)_____ml__ | 26 |
| (A mixture of about 24.3% $C_6F_{13}COONH_4$, 32.4% $C_8F_{17}COONH_4$, 24.9% $C_{10}F_{21}COONH_4$, and 18.4 $C_{10}F_{25}COONH_4$) _____g__ | 0.9 |

The autoclave is closed, heated to 165°, and the agitator run for 15–20 minutes. The resulting emulsion is shock cooled to a temperature below the melting point of the polymer mixture. A better, more uniform, product is obtained, however, if the hot emulsion is refined by passage through a colloid mill before cooling. The cool dispersion is stabilized by the addition of 1.3 g. of a cross-linked polyacrylate ("Carbopol" 961) such as described in U.S. 2,798,043; 2,858,281; 2,958,679; and 2,985,631. The resulting product is stable, and has good freeze-thaw performance. The particle size is generally a uniform 3–6 microns.

In the above dispersion preparation, the alcohol, $C_{10}F_{21}CONHCH_2CH_2OH$, can be replaced by using additional free acid $C_{10}F_{21}CONHCH_2COOH$ or alternatively by use of $C_{10}F_{21}CONH_2$. It is preferred, however, to use the alcohol as above described. Although the necessary acid surfactant may be reduced down to about 3% by weight, the particles tend to aggregate at this level. Dispersions prepared as described above are useful for coating various surfaces to impart mold release, water and oil repellent properties and the like.

As already indicated, the compositions of the invention are useful as dry lubricants and for imparting oil and water repellent properties to various surfaces. The materials form excellent oil and water repellent coatings and this is surprising in view of the fact that closely related polymers, such as those obtained by fluorinating or chlorinating the telomer iodides prepared by the thermal reaction of perfluoropropene with a telogen iodide do not lend themselves for use as repellents. As can be seen from the published data of Hauptschein et al. (J.A.C.S. 79 6248, 1957) and U.S. 3,083,238 telomers having the structure $R—[CF_2CF(CF_3)]_nX$, where R, X, and n are defined above, are liquids or low melting solids not suitable for repellent coatings.

It will be understood that the compositions of the invention may be used in conjunction with additives to obtain certain specific effects. For example, it has been found that incorporation of an organic titanate with a formulation of the products of the invention greatly aids binding of the telomer to the substrate.

The following examples will illustrate the usefulness of the composition of the invention and in several cases will illustrate the surprising superiority of the telomers of this invention over those telomers of the prior art.

*Example 1—Use as dry lubricant*

A. A formulation of 3% by weight solution in trichlorotrifluoroethane (Cl₂CF—CF₂Cl) was prepared using a polymer mixture of telomers of structure

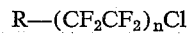

$$R—(CF_2CF_2)_nCl$$

where R is $(CF_3)_2CF—$ and where n has the following distribution:

| n | Percent |
|---|---|
| 6 | 34.4 |
| 7 | 29.4 |
| 8 | 17.3 |
| 9 | 9.7 |
| 10 | 5.0 |
| 11 | 2.4 |
| 12 | 1.1 |
| 13 | 0.5 |
| 14 to 16 | 0.2 |

Number average molecular weight of this composition is 922. This composition was sprayed onto the sliding surfaces of a desk drawer and observed daily. Initial lubricity was excellent and still very good after daily use for two weeks.

B. On the other hand, when a similar formulation containing 3% by weight of a telomer corresponding to $(CF_3)_2CF(CF_2CF_2)_5Cl$ was sprayed on the sliding surface of a desk drawer, initially lubricity was only fair and lubricity was gone after one day, due to the rather high volatility of the polymer.

*Example 2*

Brushed pigskin suede leather was sprayed with the same compositions of Example 1 and the oil and water repellency evaluated. The following Table I indicates the results obtained:

TABLE I

| Agent Tested | A.A.T.C.C. Method 22 (1964), Repellency Rating After— | | | | | |
|---|---|---|---|---|---|---|
| | Oil | | | Water | | |
| | 1 day | 2 weeks | 6 weeks | 1 day | 2 weeks | 6 weeks |
| Telomer Mixture of Example 1A | 80 | 80 | 80 | 100 | 100 | 100 |
| Telomer of Example 1B | 0 | 0 | 0 | 70+ | 70 | 70 |

Example 3—Mold release effects

A weighed 4″ x 6″ aluminum sheet was coated with a spray of the formulation of Example 1A and a similar weighed sheet coated with a telomer composition corresponding to that described in U.S. 3,067,252. Then an epoxy type adhesive (Bond Masker #472) was smeared on the treated sheets and allowed to stand 72 hours. Table II indicates the observed data.

TABLE II.—EASE OF REMOVAL FROM ALUMINUM SHEET

Formulation:
- Example 1A _____ Peels off easily.
- Composition described in U.S. 3,067,252 _____ Difficult to remove.

Instead of using the composition of 1A in the above example, similar mold release effects are obtained when using a composition of structure $$CF_2Cl(CF_3)CF—(CF_2CF_2)_nCl$$

where the components are distributed as follows:

| $n$ | Percent |
|---|---|
| 6 | 28.4 |
| 7 | 27.5 |
| 8 | 19.8 |
| 9 | 10.5 |
| 10 | 8.1 |
| 11 | 3.0 |
| 12 | 1.4 |
| 13 | 0.8 |
| 14 to 16 | 0.5 |

Number average molecular weight of this composition is 962.

Example 4

Using standard test procedures for oil and water repellency tests, a composition of the invention of structure $(CF_3)_2CF(CF_2CF_2)_nCl$ was evaluated on suede leather and cotton cloth. The mixture of the invention had the following composition:

| $n$ | Percent |
|---|---|
| 6 | 36.1 |
| 7 | 28.7 |
| 8 | 17.2 |
| 9 | 9.3 |
| 10 | 4.8 |
| 11 | 2.3 |
| 12 | 1.0 |
| 13 | 0.4 |
| 14 to 16 | 0.2 |

This composition melted at 105° to 135° C. and analyzed as follows: percent C=22.16; percent H=none. Found: percent F=73.62; percent Cl=3.90; I=less than 3.2 p.p.m. Its number average molecular weight calculated as 917.

strate. Thus, the compositions give clear, colorless films which actually enhance the drape of the treated fabric.

Example 5—Antispread control

Two degreased carbon steel panels (50 mm x 100 mm.) were masked with pressure-sensitive tape to provide three masked 20 mm. x 20 mm. squares on each panel. One masked panel was sprayed (4 passes) with an aerosol formulation containing 2% by weight of a telomer composition of structure $(CF_3)_2CF(CF_2CF_2)_nCl$ where $n$ is distributed as follows:

| $n$ | Percent |
|---|---|
| 6 | 34.2 |
| 7 | 27.8 |
| 8 | 17.0 |
| 9 | 10.6 |
| 10 | 5.8 |
| 11 | 2.9 |
| 12 | 1.1 |
| 13 | 0.1 |
| 14 to 16 | 0.5 |

The second panel was similarly sprayed with an aerosol containing the telomer composition of U.S. 3,067,252 as active agent. After air drying the coatings for a few minutes, the masking take was removed and a drop of light machine oil was placed in the center of each untreated area and the panels placed in a vertical position.

After three minutes, the oil on the panel treated with the composition of U.S. 3,067,252 had run over the edge and into the coated area. The panel treated with the composition of this invention, however, retained the oil within the untreated area for well over one hour.

Example 6

An aqueous dispersion was prepared as described above using a composition of structure $(CF_3)_2CF(CF_2CF_2)_nCl$ where the distribution was as follows:

| $n$ | Percent |
|---|---|
| 6 | 28.6 |
| 7 | 27.1 |
| 8 | 17.2 |
| 9 | 10.7 |
| 10 | 6.7 |
| 11 | 3.4 |
| 12 | 2.2 |
| 13 | 2.0 |
| 14 | 1.1 |
| 15 | 0.6 |
| 16 | 0.4 |

Number average molecular weight of this composition is 956. Paper was coated with the dispersion and allowed to dry. Then, pressure-sensitive cellophane tape was applied to the treated paper, but it woud not stick.

It will be understood that numerous changes and variations may be made from the above description and examples without departing from the spirit and scope of the invention.

We claim:
1. A polymer mixture consisting essentially of at least about 90% by weight of a mixture of polymers of the structure R—$(CF_2CF_2)_nX$ wherein R contains from 1 to 4

TABLE III

| | Percent Pickup | Oil | Water | Visual appearance of treated material | Hand of treated fabric |
|---|---|---|---|---|---|
| Tests on Leather: | | | | | |
| Composition of Ex. 4 | 2.9 | 110 | 100 | No change | No change. |
| Composition of U.S. 3,067,252 | 3.0 | 0 | (¹) | Chalky | Dry. |
| Tests on cotton cloth: | | | | | |
| Composition of Ex. 4 | 4.0 | 110 | 100 | No change | Good drape. |
| Composition of U.S. 3,067,252 | 4.2 | 0 | (¹) | ___do___ | Slightly stiff. |

¹ Wets.

It is obvious from the above Table III that the composition of the invention is extremely effective in its water and oil repellency properties without adversely affecting the properties of the treated material. Particular attention is called to the fact that when the composition of the invention is used, no chalky film is placed upon the subcarbon atoms and is selected from the group consisting of perfluoroalkyl and monochloroperfluoroalkyl, X is selected from the group consisting of chlorine and fluorine and $n$ is an integer from 6 to 10, and wherein the balance of the polymer mixture comprises polymers of the above structure where $n$ is 11 to 16.

2. A polymer mixture as in claim 1 wherein the amount of those components which have a value of $n$ from 6 to 7 exceed the amount of those components where $n$ is 8 to 10.

3. A polymer mixture consisting essentially of at least about 90% by weight of a mixture of polymers of the structure R—$(CF_2CF_2)_nX$ wherein R contains from 1 to 4 carbon atoms and is selected from the group consisting of perfluoroalkyl and monochloroperfluoroalkyl, X is selected from the group consisting of chlorine and fluorine and $n$ is an integer from 6 to 10, and wherein the balance of the polymer mixture comprises polymers of the above structure where $n$ is 11 to 16, the amounts of a specific polymer corresponding to $n$ decreasing as $n$ increases.

4. A polymer mixture as in claim 3 wherein R is $(CF_3)_2CF$— and X is chlorine.

5. A polymer mixture as in claim 3 wherein R is $CF_2Cl(CF_3)CF$— and X is chlorine.

6. A polymer mixture consisting of about 95% by weight of a mixture of polymers of the structure $$(CF_3)_2CF(CF_2CF_2)_nCl$$

where $n$ is an integer from 6 to 10 and wherein the balance of the polymer mixture comprises polymers of the above structure where $n$ is 11 to 16.

References Cited
UNITED STATES PATENTS 3,002,031    9/1961    Hauptschein et al. ___ 260—653.1
3,156,732    11/1964    Hauptschein et al. ___ 260—653.1

DANIEL D. HORWITZ, *Primary Examiner.*